(12) United States Patent
Ironside (10) Patent No.: US 6,175,793 B1
(45) Date of Patent: Jan. 16, 2001

(54) GEARBOXES

(75) Inventor: John Michael Ironside, Birmingham (GB)

(73) Assignee: TRW Lucas Varity Electric Steering Ltd., West Midlands (GB)

( * ) Notice: Under 35 U.S.C. 154(b), the term of this patent shall be extended for 0 days.

(21) Appl. No.: 09/230,979

(22) PCT Filed: Aug. 7, 1997

(86) PCT No.: PCT/GB97/02137

§ 371 Date: Oct. 28, 1999

§ 102(e) Date: Oct. 28, 1999

(87) PCT Pub. No.: WO98/05544

PCT Pub. Date: Feb. 12, 1998

(30) Foreign Application Priority Data

Aug. 7, 1996 (GB) .................................................. 9616577

(51) Int. Cl.$^7$ ...................................................... B62D 6/00
(52) U.S. Cl. ........................ 701/41; 180/65.6; 180/65.7; 180/65.8; 180/170; 180/400; 477/34; 280/93.5
(58) Field of Search .............................. 701/41; 180/65.6, 180/65.7, 65.8; 280/93.5; 182/170, 400; 477/34

(56) References Cited

U.S. PATENT DOCUMENTS 3,936,071  2/1976  Ricketts et al. ...................... 280/95 R
5,161,634 * 11/1992  Ichihara et al. ...................... 180/179

FOREIGN PATENT DOCUMENTS

3402933A1   8/1985  (DE) .
0625651    11/1994  (GB) .

* cited by examiner

Primary Examiner—William A. Cuchlinski, Jr.
Assistant Examiner—Yonel Beaulieu
(74) Attorney, Agent, or Firm—Tarolli, Sundheim, Covell, Tummino & Szabo L.L.P.

(57) ABSTRACT

A gearbox monitoring apparatus is disclosed for use in combination with a gearbox (4) which provides a connection between an input shaft (3) driven by a motor (1) and an output shaft (2), said gearbox monitoring apparatus comprising a first position sensing means (11) and a second position sensing means (12), said first and second position sensing means generating a respective first and second output signal, said first output signal being representative of the angular position of the input shaft and said second output signal being representative of the angular position of the output shaft, a torque signal generating means (6) which generates a third output signal representative of the torque carried by the gearbox (4), and signal processing means (15) adapted to receive said output signals and to process said output signals to produce one or more modified output signals representative of the wear in the gearbox.

25 Claims, 7 Drawing Sheets

*Fig. 1*

PRIOR ART

GEARBOXES

This invention relates to improvements in gearbox monitoring systems, especially, but not exclusively, for use in combination with a reduction gearbox in an electric power steering system.

It is known, in the art to provide power assistance to a steering system by employing an electric motor which drives the steering column through a reduction gearbox, typically comprising a gearbox housing and a gearset in the form of a toothed reduction wheel and a worm wheel. In operation, electric signals passed to a control unit from a torque sensor mounted on the steering column are used to control the drive of the electric motor.

In this kind of safety critical application, and indeed in any similar application which employs a gearbox, it is important to avoid jamming in the gearbox. This condition may arise if foreign matter is present in the gearbox, or if damage or excessive wear occurs to the teeth of the gearset. Jamming can prevent the rotation of the gears in the gearbox, and results in an unsafe operational state.

Because of the possible safety implications of jamming in the gearbox, designers have in the past taken several steps to prevent such an occurrence. Gearboxes have often been over-engineered to prevent excessive wear, and long term testing has typically been used to study the wear pattern of the gears. Other steps have been directed towards reducing the amount of unwanted material within the gearbox, minimising the possibility of a piece of material becoming free.

A difficulty with these prior solutions is that they are both expensive and time-consuming to implement. Furthermore, there is still no guarantee that a jam will not occur.

According to a first aspect of the present invention, we provide a gearbox monitoring apparatus for use in combination with a gearbox which provides a connection between an input shaft and an output shaft, said gearbox monitoring apparatus comprising:

a first position sensing means and a second position sensing means, said first and second position sensing means generating a respective first and second output signal, said first output signal being representative of the angular position of the input shaft and said second output signal being representative of the angular position of the output shaft;

a torque signal generating means which generates a third output signal representative of the torque carried by the gearbox; and signal processing means adapted to receive said output signals, said signal processing means being adapted to produce a difference signal representative of the difference between the angular position of the input shaft and the output shaft from the first and second output signals, and in which said signal processing means is adapted to divide the difference signal values into two steams corresponding to the third output signal representative of negative torques and positive torques respectively and to process said two streams of output signals to produce one or more modified output signals representative of the wear in the gearbox.

This monitoring apparatus is advantageous in that it enables the wear in the gearbox to be monitored during operation. Preferably, the input shaft comprises a driven shaft driven by a motor.

Preferably, the gearbox monitoring apparatus may be used in combination with a gearbox in an electric power assisted steering system. In this case, there are two inputs, one manual and one powered, which are combined using the gearbox to produce a single boosted output. The manual input is the side of the steering column shaft connected to the steering wheel, and the powered input is driven by the motor. The output shaft torque is used to turn the road wheels.

The torque signal generating means may comprise a torque sensor. Alternatively, the gearbox torque may be inferred as a function of measured parameters such as the motor drive current, velocity and acceleration. In the case of an electric power steering system, the gearbox torque signal may be generated by measuring the driver imposed torque using a torque sensor sited between the driver's steering wheel and the gearbox, along with measurements of the steering column position, velocity and acceleration.

Preferably, the gearbox monitoring apparatus produces a modified output signal which comprises a first modified output signal representative of the backlash and a second modified output signal representative of the compliance of the gearset within the gearbox. The first modified output signal may be produced by correlating the signals from the first and second position sensors at different torque values. The second modified output signal may also be produced by correlating the signals from the first and second position sensors at different torque values.

Some gearboxes have been found to have a backlash that increases slowly as the gearteeth wear, but to have compliance that hardly varies at all over the life of the system. For these gearboxes, it has been found that it is possible to rely upon a fixed preset value of gearbox compliance which can be multiplied by the motor torque to produce the second modified output signal value for different torques. This simplifies the calculation by making an assumption about gearbox compliance.

Such a monitoring apparatus is advantageous over the prior art as it allows imminent failure of the gearbox to be predicted before it occurs and, in any event, enables a jamming situation to be readily identified.

The gearbox monitoring apparatus may also include a speed sensor which generates a fourth output signal representative of the rotational speed of the output shaft. In a power-assisted steering system, this would therefore produce a measure of the rotational speed of the steering column. A single sensor could be used to provide both the third output signal (torque) and the fourth output signal (speed).

The gearbox monitoring apparatus may also include a trigger means adapted to generate a trigger signal in response to a trigger stimulus. The trigger means determines the timing of the measurements made by the sensing means. Preferably, a dataset of output signals is produced in response to each trigger signal, the dataset comprising a single output from each sensor. The trigger stimulus may be a set position of the input shaft or output shaft for example, in which case a dataset of values will be produced every time the shaft passes the set position. Alternatively, the trigger stimulus may be a clock signal, with datasets produced on each clock pulse. Preferably, each of the sensors produce a continuous output signal which is sampled by the signal processing means on each trigger signal.

In a preferred embodiment, the trigger stimulus may be the movement of a motor rotor magnetic pole past a Hall effect sensor. This is advantageous in, for example, an electric power steering system as it enables the existing motor control circuitry to be employed to generate the trigger stimulus, thus reducing cost and reducing complexity. If a clock signal is used, it should be of a sufficient frequency that at least two events occur within the fastest revolution of the input shaft or motor to prevent the system loosing track of position.

The output signals forming the dataset are preferably synchronised so that they each represent the state of the respective measurands at an instant in time determined by the trigger signal. This can be done by making the measurements simultaneously in time, or may be performed by employing time domain interpolation to generate effectively simultaneous measurements.

The gearbox monitoring apparatus may further include a warning means adapted to produce a warning signal in the event that the modified output signals produced by the signal processor indicate a jam has occurred or is likely to occur. A fault alleviation means may also be provided. The warning signal may be in the form of an audio/visual or haptic signal. Most preferably, the warning signal comprises vibrating the output shaft by exciting the motor in a clockwise and anti-clockwise direction using an alternating frequency current.

The first output signal and the second output signals may be measured relative to a respective arbitrary datum. This datum may initially be a predetermined angular position of the shaft. In the case where a clutch is provided on the input side of the gearbox, so that the clutch is between the first position sensing means and the gearbox, there will be an arbitrary offset between the datums of the input and output shafts. This offset will be constant during a single engagement of the clutch, but will vary every time the clutch is disengaged and re-engaged. The first and second sensing means may produce an output signal in the range 0 to 1 over a revolution of the shaft. In this case, a tracking means may be provided which keeps a track of the actual shaft displacement relative to an arbitrary datum.

Thus, in accordance with the first aspect of the invention, we provide an apparatus which enables at least the backlash in a gearbox to be measured by correlating data from the input and output position of the output and input shafts.

According to a second aspect of the invention, we provide a method of monitoring the performance of a gearbox using an apparatus according to the first aspect of the invention, comprising a first step of calculating an "ideal" output shaft position by processing the first output signal, and a second step of calculating a difference signal y representative of the difference between the "ideal" output shaft position signal and the actual measured output shaft position signal.

Because there may be an arbitrary relationship between the input shaft position and the output shaft position, the first step may further include resetting the datum about which the "ideal" output shaft position is estimated to be the same as the actual output shaft datum. This overcomes the problem where the input shaft datum (upon which the "ideal" shaft position measurement datum depends) is not fixed relative to the actual datum of the output shaft, i.e. if a clutch is present.

The difference signal y so produced represents a combination of the backlash component, compliance of the gearbox and any arbitrary error between the actual and ideal output shaft datums. Accordingly, analysis of several such difference signal values obtained over a period of time enables the backlash and compliance values to be estimated. In general, the relationship between the difference signal and torque satisfies two linear equations, one for positive and one for negative torque values. Thus, the method may comprise the further step of fitting the difference value and respective torque values into a pair of linear equations, each linear equation corresponding to negative and positive values of torque.

The method may also comprise a fourth step of using the fourth output signal (speed signal) associated with each of the first and second output signals in a dataset to determine the accuracy of the first and second output signals, and rejecting any datasets if the speed is either above a first preset value or below a second preset value. In this manner, only selected ones of the difference signal/torque signal pairs are fitted to the linear equations.

Preferably, the signal processor employs a recursive estimating filter in order to estimate the backlash and compliance values from the displacement and torque signals. The recursive filters may effectively perform the process of fitting the signals into the respective linear equations.

The recursive filters may be adapted to generate a confidence signal which is an estimate of the accuracy of the backlash and compliance signals. This confidence signal may be processed by the warning signal indicating means so that a warning signal is only generated if the compliance and backlash signals meet preset criteria and the reliability of the signals also meets a preset level. This will prevent false warning signals during start-up when only a few values have been fitted to the linear equation.

Furthermore, in order to increase the speed at which the filters "learn" on initial start-up, the backlash and compliance values obtained by this method when the apparatus was last used are retained and re-used as the start-up values for the filters. On initial operation for the first time, when no such previously obtained values exist, arbitrary values may be assigned.

The method may also comprise the additional steps of generating several sets of backlash and compliance signals, each set corresponding to a different angular position of the output shaft. This is advantageous, as it allows the wear on individual portions of the shaft (as opposed to an average wear around the shaft) to be estimated.

One embodiment of the invention is illustrated by way of example in the accompanying drawings, in which.

Figure 1:
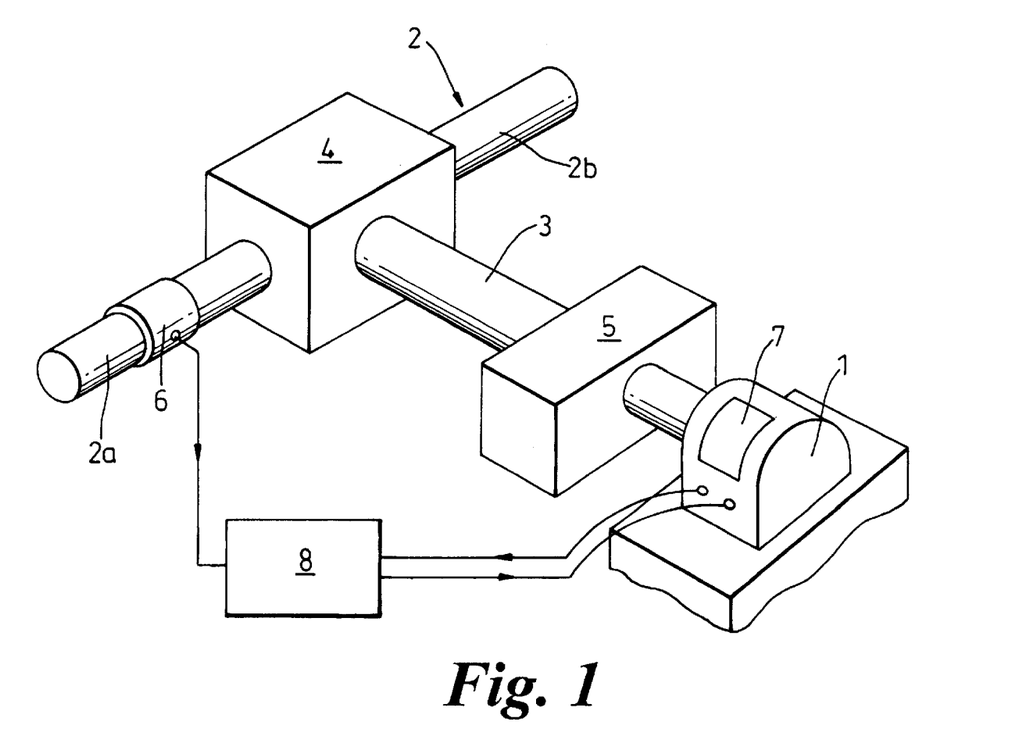
FIG. 1 is a schematic view of an electric power steering system.

FIG. 1 shows schematically the specific components of an electric power steering system which contains a gearbox that may be monitored by the present invention. An electric motor 1 applies a calculated torque to a steering column 2 via a motor shaft 3 and a gearbox 4. The calculated torque is derived as a function of the driver's demand and other parameters such as vehicle and or steering speed and steering position. A clutch 5 is also provided between the motor and the gearbox. A torque sensor 6 is provided on the steering column shaft, and torque measurements from the torque sensor are input to a motor controller which is used to control the electric motor, in turn providing assistance in turning the steering column. The motor includes a motor position sensor implemented using three Hall effect switches 7 and a control unit 8.

In use, the system effectively comprises two input shafts and one output shaft. The first input shaft is the portion 2a of the steering column 2 between the gearset and the steering wheel (not shown). This portion of shaft carries a torque applied by the driver via the steering wheel (not shown). The second input shaft is the motor shaft 3 which applies a torque to the steering column shaft 2 via the gearbox. The output shaft is the portion 2b of steering column 2 after the gearbox which carries the sum of the motor torque and driver applied torque. Thus, the motor provides power assistance. The relationship between the torque in each shaft can be expressed as:

steering wheel torque+motor torque=steering output torque to load.

Figure 2:
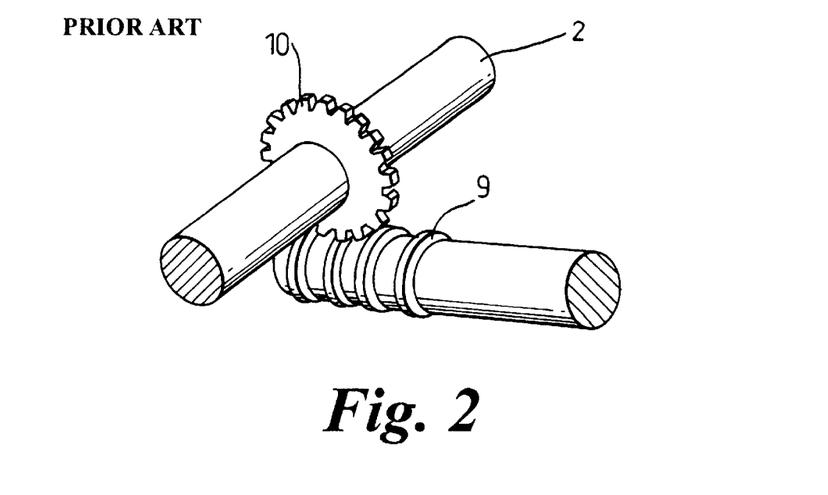
FIG. 2 is an isometric view of a typical gearset which comprises a worm gear provided on the input shaft and worm wheel provided on the output shaft.

FIG. 2 shows a typical gearbox for use in such a system. The gearbox includes a worm gear 9 provided on a worm shaft which may be part of the motor shaft, the wheel engaging with a worm wheel 10 provided on the steering column 2.

Figure 3:
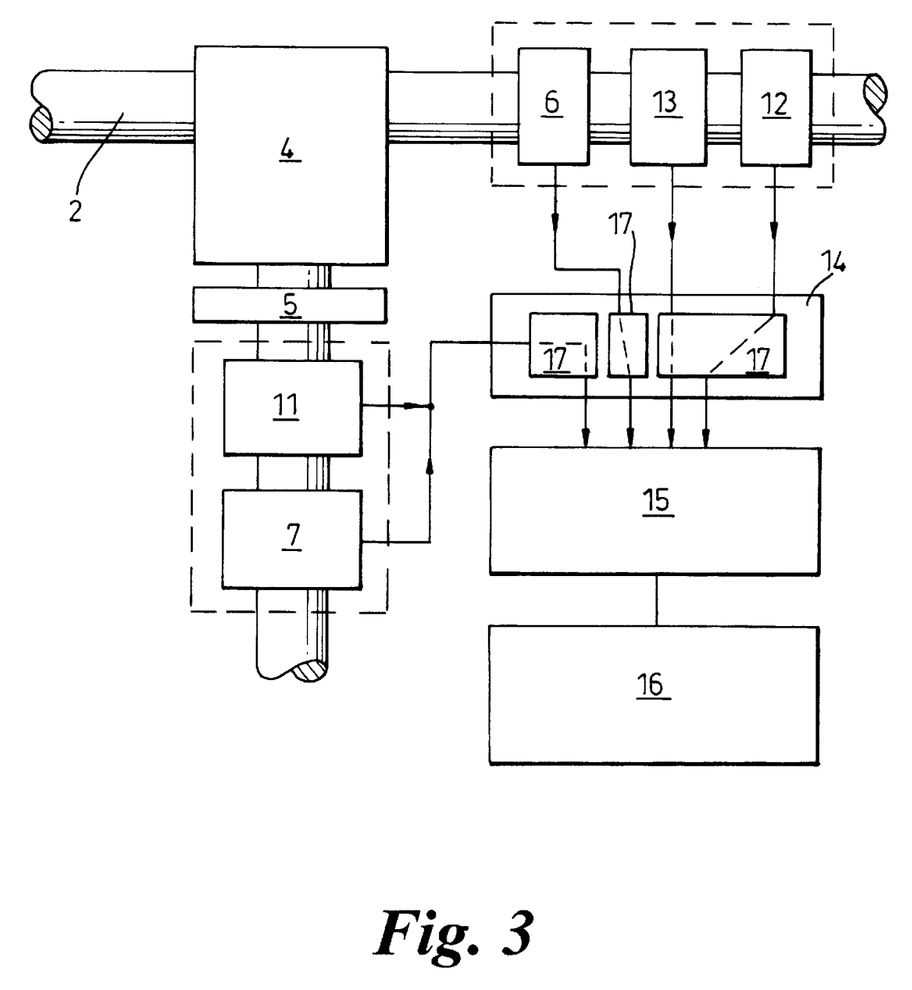
FIG. 3 is a schematic view of the components which make up the gearbox monitoring apparatus and their interrelationship with the steering system of FIG. 1.

FIG. 3 illustrates in block form the gearbox monitoring apparatus for use in combination with the gearbox in the system shown in FIGS. 1 and 2. In addition to a torque sensor 6, a first position sensing means 11 is provided which generates a first output signal indicative of the angular position of the motor shaft. This may be a separate sensor (as shown in the diagram) but preferably the motor position sensor required for motor control purposes can be employed to provide this information. In our earlier application Ser. No. 9,523,531.3, we provide a plurality of Hall effect sensors 1 which enable the position of the electric motor to be determined. The first position sensor produces a signal in the range 0 to 1 over a full 360° revolution of the motor shaft relative to an arbitrary datum point.

A second sensing means 12 is also provided which generates a second output signal representative of the angular position of the output shaft 2 (in this case the steering column). Again, this may be provided by a discrete sensor, or alternatively, the position signal could be extracted from a suitable signal generated by a torque sensor: The second sensor also produces a signal over the range 0 to 1 over a full 360° revolution relative to an arbitrary datum.

A third sensor 6 is provided which produces a signal representative of the torque carried by the gearbox. The sensor 6 measures the torque applied by the driver in the portion 2a of the steering column 2. The torque carried by the output shaft portion 2b of the steering column 2 is dependent upon the sum of the torque measured by the sensor 6 and the torque applied by the motor. The torque applied by the motor is dependent on both the applied torque as measured by the sensor 6 and the vehicle speed, steering column velocity and motor drive current, and hence a third output signal representative of the torque carried by the gearbox can be derived using the equation:

gearbox torque=driver applied torque+motor applied torque.

A fourth sensor is also provided which produces a fourth signal indicative of the rotational speed of the steering column, and this sensor may be combined with the torque sensor 6 to form a single unit.

In addition to the sensing means, the monitoring apparatus includes a trigger means 14 and a signal processor 15 which may include the control means for the motor in a single unit.

The trigger unit 14 produces a trigger signal in response to a trigger stimulus. In this example the trigger stimulus is the movement of a rotor of the motor past one of the Hall sensors. However, it is easy to adapt the system to produce a trigger signal at several different rotor positions. On producing the trigger signal, the signal processor receives an output signal from each of the sensors, effectively taking a "snapshot" of the parameters measured every time a trigger signal is generated. Each set of signals is input to the signal processor as a dataset.

The trigger event causes a dataset of synchronised first, second, third and fourth output signals indicative of the input shaft position, output shaft position, torque and velocity to be generated.

In the embodiment described here, due to the presence of the clutch means 5 there exists an arbitrary relationship between the position of datums for the motor shaft (and hence motor stator) and the steering column shaft. Every time the clutch disengages and re-engages, this arbitrary relationship changes. Of course, in a system in which no clutch is present, the relationship between motor and steering column shaft portions is greatly simplified.

Figure 4:
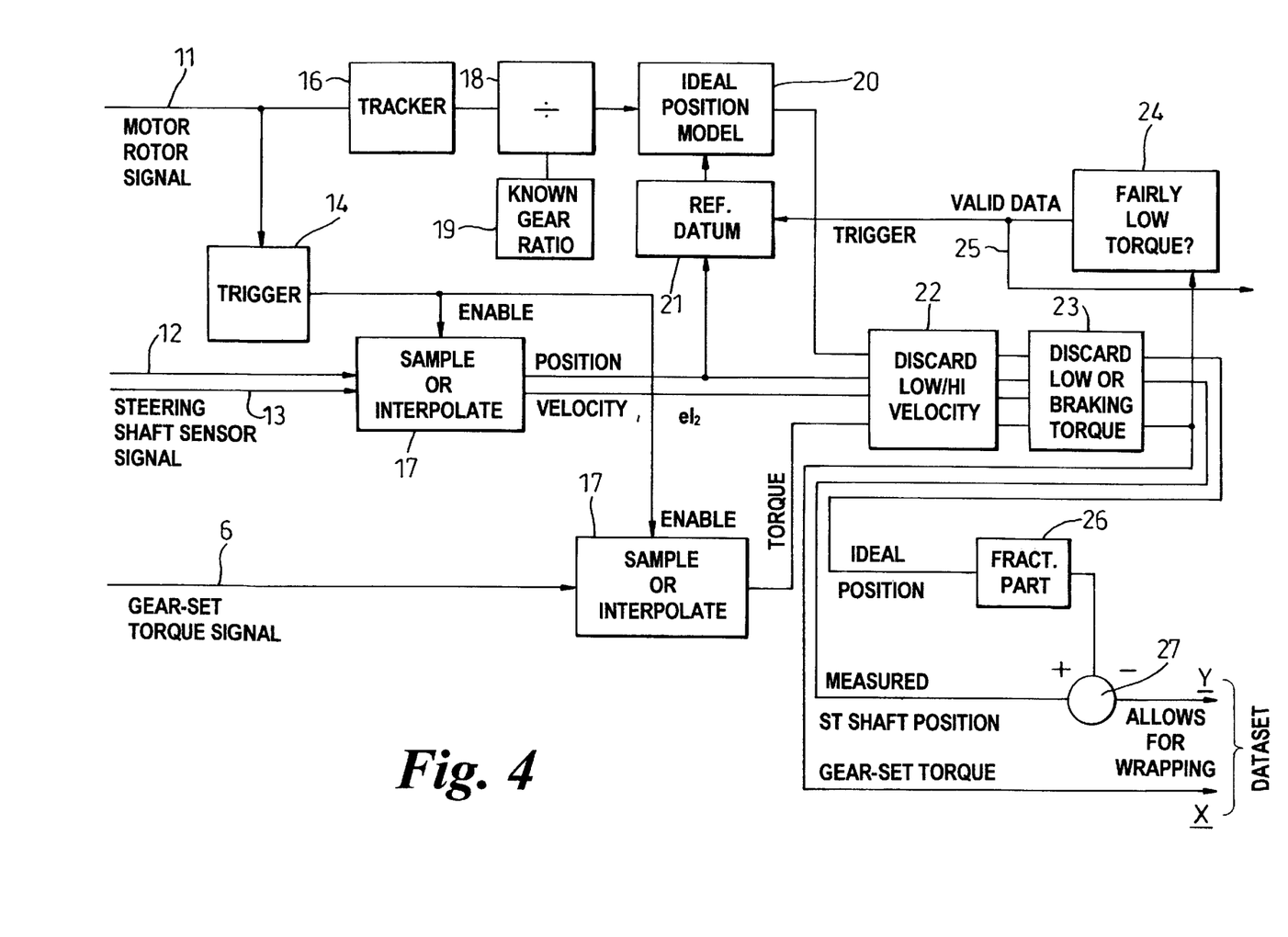
FIG. 4 is a schematic showing the first steps of the method embodied in the signal processing means in accordance with the present invention.
Figure 5:
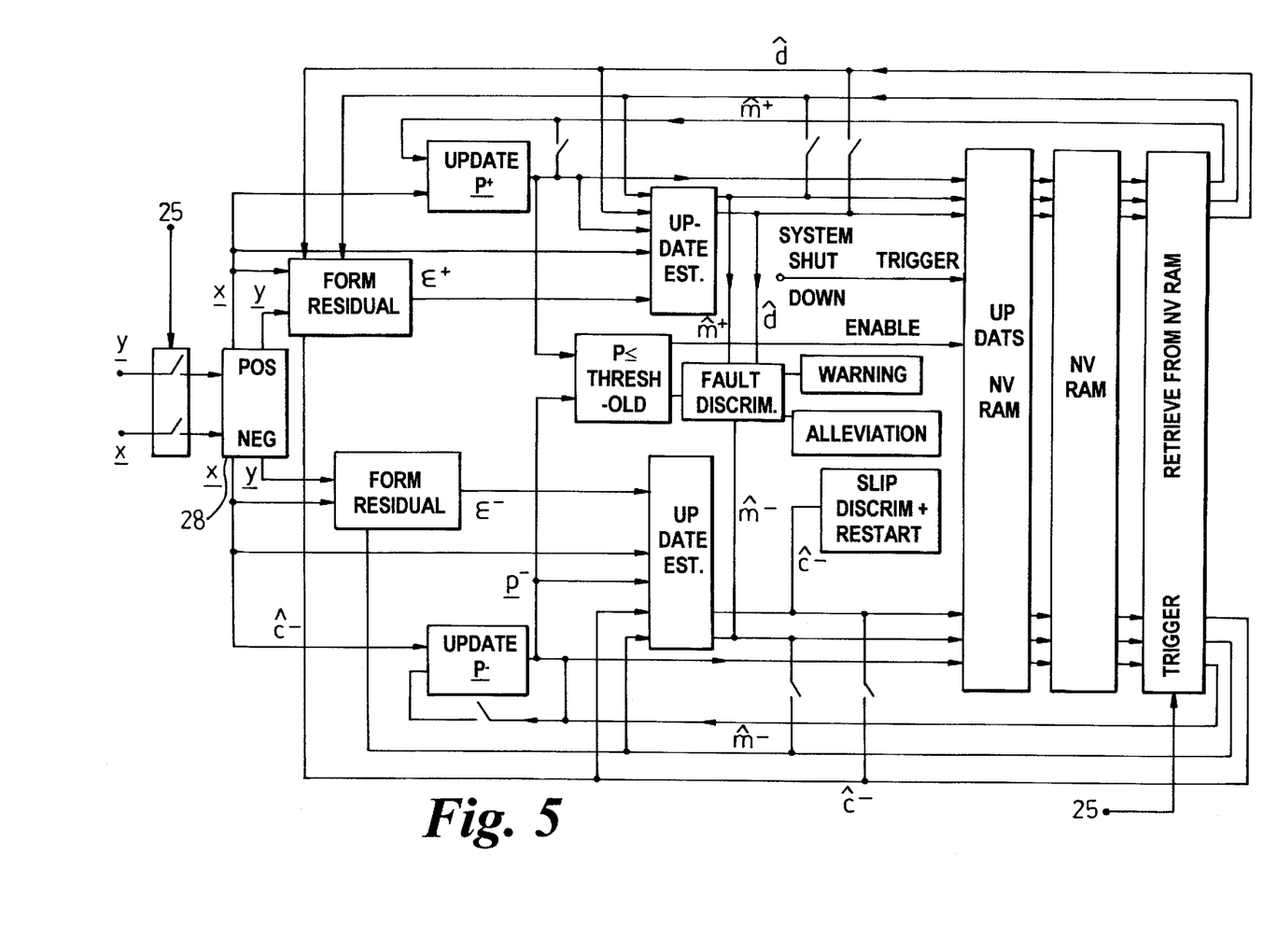
FIG. 5 is a second schematic showing the final steps of the signal processing to produce an estimate of the backlash and compliance of the gearbox.

The method of operation of the signal processing means is shown in the form of a block diagram in FIGS. 4 and 5. FIG. 4 shows the first stage of the signal processing scheme in which each dataset of four output signals from the sensing means is processed to produce a secondary dataset of just two signals indicative of the difference y and the torque x as explained hereinafter. The signal processor estimates an "ideal" steering column shaft position signal from the motor shaft position signal. This is readily performed provided a knowledge of the gear ratio is held by the processor. In this embodiment, the motor shaft position signal is measured from the motor rotor, and lies in the range 0 to 1 over a single revolution of the motor. Also the steering column shaft signal lies over the range 0 to 1 over a single revolution.

A tracker 16 is implemented in software which is continually updated by motor rotor position measurements (in the range 0 to 1) so that the signal processor 15 keeps a record of its displacement (in the range −r to +r) relative to the arbitrary motor shaft datum which is normally chosen to be the motor rotor position at start up. The value of r is given by r=R×g, where R is the maximum steering wheel turns from lock to lock and g is the velocity ratio of the gearbox.

The tracker maintains a record of both the fractional and integer number of revolutions of the motor shaft (i.e. motor rotor) relative to this datum point. An "ideal" position of the steering column shaft is then estimated in software by dividing the motor shaft position held by the tracker by the known gear ratio. Again, this "ideal" steering column shaft position (in the range −R to +R) is relative to an arbitrary datum, which will not be the same as the datum for the actual measured steering column shaft position at this stage.

If the steering column shaft velocity is very high then errors made in the position measurements, particularly those caused by delays will be relatively severe. If the velocity is very low then measurements made using time domain interpolation will be relatively inaccurate. Furthermore, a reversal of output shaft direction may be imminent or may have just occurred which will also result in an error. The signal processor therefore rejects datasets which correspond to very high or low steering shaft velocities.

Figure 6:
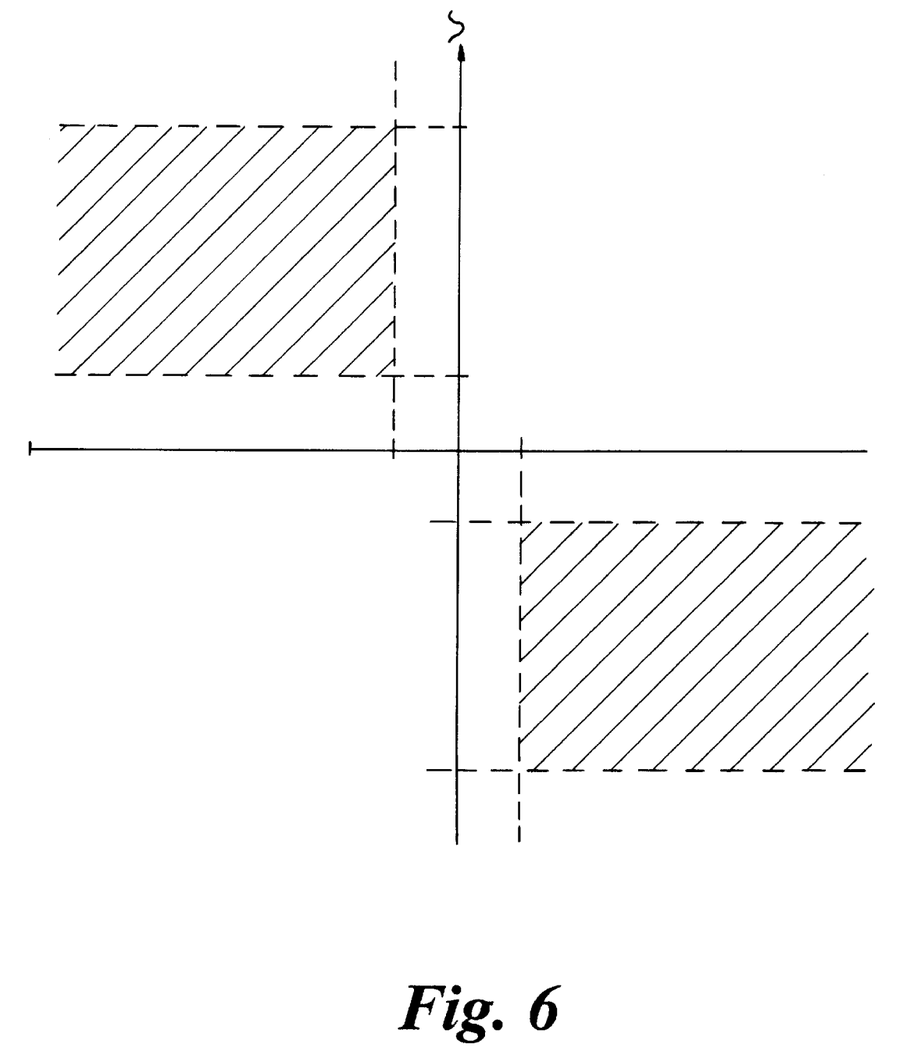
FIG. 6 illustrates the range of acceptable dataset output signals (shaded), the unshaded regions representing output signals which are rejected by the signal processor in a plot of gearset torque T against velocity V.

Power flowing from the steering column shaft to the motor, rather than the other way round (a situation known as powered braking) will also occur from time to time. In the electric power steering system, this only occurs during a small part of the operational duty cycle. Therefore, these signals corresponding to powered braking are also rejected. This is shown in FIG. 6, with only measurements obtained in the shaded area being accepted.

In order for the "ideal" and actual steering column shaft position signals to be correlated, the motor position datum must be set so that the "ideal" estimated and actual measured signals are measured with respect to the same datum. This is performed in software using the ideal position calculating means by resetting the datum for the "ideal" position measurements as soon as a set of motor shaft and actual steering column shaft position signals corresponding to a relatively low torque are obtained. In this case, the "ideal" position is calculated from the rotor position signal, and the "ideal" datum is then reset so that datums for the "ideal" and actual output shaft signals coincide. The signal processor repeats this process several times to increase accuracy. In this manner, only a small error in the value of the datums will exist (due mainly to backlash and compliance), and this error can be removed by the signal processor in a latter stage, as will be shown.

Having estimated the "ideal" steering column shaft datum position, the difference signal y can now be calculated by subtracting the fractional part of the "ideal" position signal from the measured steering column shaft position signal. Remembering that both the steering shaft position sensor output signal range and the fractional part of the "ideal" position signal exactly map onto one revolution of the steering shaft, they may straddle the point at which they wrap around from just below one to just above zero. So, if the result of the subtraction is not close to zero, but just below +1, a further +1 is subtracted; if the result is just greater than −1, a further −1 is subtracted, thus a proper measure of the displacement in a circular space is obtained.

The signal processor can, in the above manner, obtain a series of secondary datasets, each secondary dataset comprising a difference signal y and a torque signal x. A separate secondary dataset is produced for each trigger signal, except where the signals are to be disregarded, e.g. they correspond to high velocity.

In the remaining steps, shown in FIG. 5, the signal processor splits the secondary datasets into two streams of secondary datasets; those with negative torque values and those with positive torque values. Of course, the datasets could be separated at an earlier stage, i.e. before the secondary datasets are produced. Each stream is fitted into a first order polynomial estimating filter. The filters estimate the dependence of the difference signal y on the magnitude of the torque x for clockwise and anticlockwise torque respectively, and from those estimates the backlash and positive and negative compliances are estimated.

The negative datasets are fitted into a recursive estimation filter that adjusts the parameters $m^-$ and $c^-$ in a model of the form:

$$y = m^- x + c^-$$

to obtain a best fit solution. The positive datasets are likewise fed into a recursive estimation filter of that adjusts the parameters $m^+$ and d in a model of the form:

$$y = m^+ x + c^- + d$$

Figure 7:
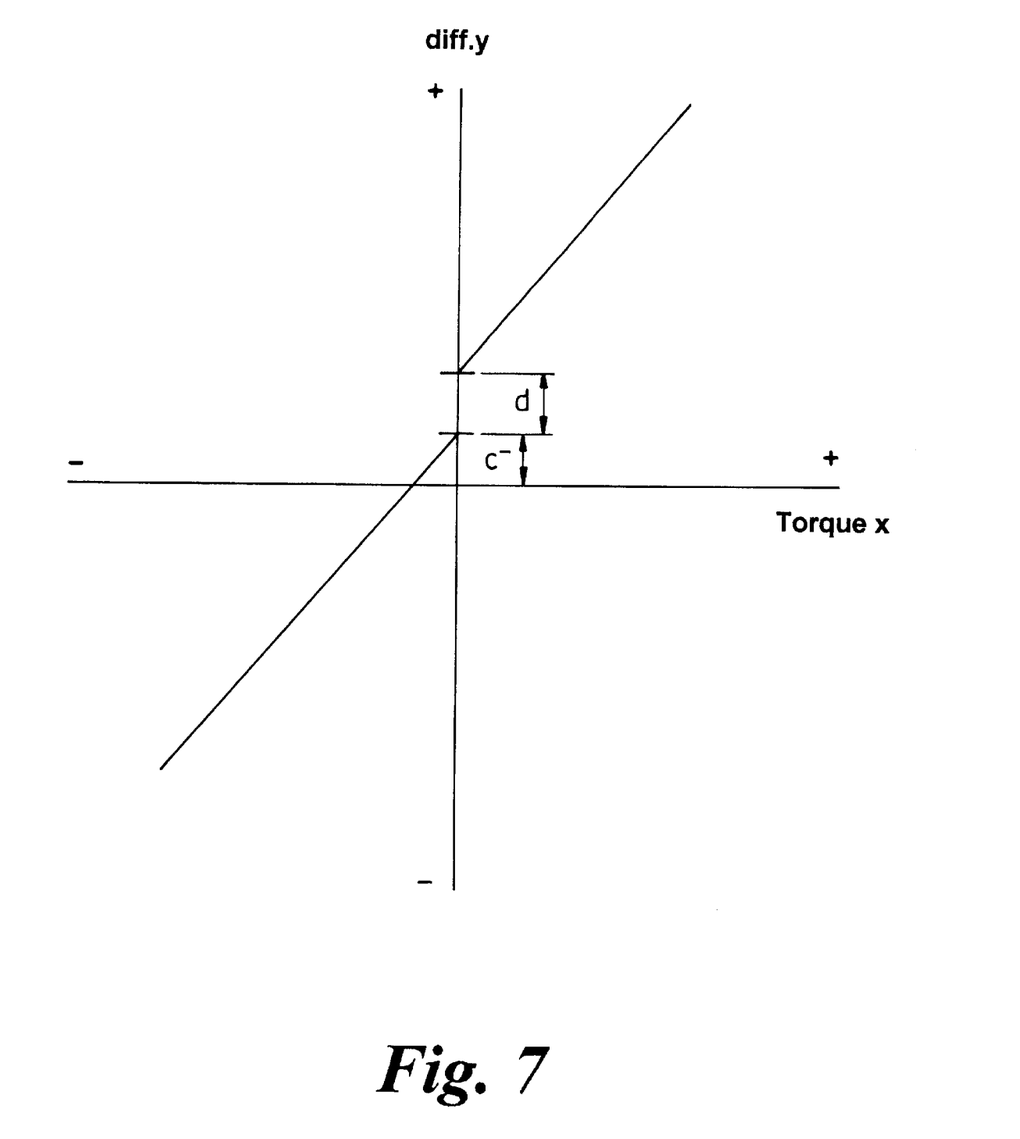
FIG. 7 illustrates the origin of the terms $m^-$, $m^+$, x, y and d and $c^-$ estimated by the signal processor.

FIG. 7 shows an example of the solutions to the two equations for a hypothetical gearset, in order to facilitate explanation of the significance of the terms in the equation.

In FIG. 7, the difference signal y is plotted against the torque signal x. Two lines are shown, one for the negative torque values and one for the positive values. The term d in the equations is a measure of the backlash in the gearbox, and is equal to the difference in displacement between the two lines as shown in the Figure. The value $m^+$, $m^-$, which is the gradient of the negative and positive torque lines, is a measure of the compliance of the gearbox. It can be seen from FIG. 7 that the compliance causes an increasing difference signal value as the torque increases.

The final term $c^-$ arises due to the arbitrary relationship between the datum points for the actual measured and "ideal" shaft position signals. If the datum for the "ideal" signal is identical to the datum for the actual signal, and the gearset exhibited no backlash, the two lines in the graph would pass through the origin. However, any difference between the two datums results in an offset, $c^-$. As previously described, the value of $c^-$ can be minimised through the process of resetting the datum in response to several motor/steering column shaft position readings obtained at low torque levels.

Several approaches exist for obtaining the estimates of the values in the two equations. The Matrix inversion Lemma Recursive Least Square (RLS) algorithm, (version 1), given in Wellstead P E and Zarrop M B, "Self-tuning systems: control and signal processing", Wiley, Chichester, England 1991 is used in this embodiment.

For each negative torque secondary dataset, fresh estimates of $m^-$ and $c^-$ are formed using the following sequence of steps:

(i) Form a vector $\underline{x}(t+1) = [x(t+1) 1]$, where x (t+1) is the new sample of the (−ve) gearset torque.

(ii) Calculate the estimation residual $\epsilon^-(t+1) = y(t+1) - \underline{x}(t+1)\underline{\hat{\Theta}}^-(t)$ where $y(t+1)$ is the matching relative displacement, and $$\underline{\hat{\Theta}}^- = \begin{bmatrix} \hat{m}^- \\ \hat{c}^- \end{bmatrix}$$

is the estimate vector.

(iii) Update the matrix $\underline{P}^-$, using:

$$\underline{P}^-(t+1) = \underline{P}^-(t)\left[I - \frac{\underline{x}^T(t+1)\underline{x}(t+1)\underline{P}^-(t)}{1 + \underline{x}(t+1)\underline{P}^-(t)\underline{x}^T(t+1)}\right]\lambda^{-1}$$

(iv) Update the estimate vector, using:

$$\underline{\hat{\Theta}}^-(t+1) = \underline{\hat{\Theta}}^-(t) + \underline{P}^-(t+1)\underline{x}^T(t+1)\epsilon^-(t+1)$$

The scalar parameter λ is a so-called forgetting factor that enables the estimator to follow a change in the system being modelled, even after a long period during which the actual parameters have been extremely stable. A value of 0.995 has been found to give a good compromise between low noise on the estimates and rapid recognition of a change in the system being estimated.

The matrix $\underline{P}^-$ represents a measurement of the confidence that can be placed in the estimates. Suitable initial values for the algorithm when first used are:

$$\underline{P}^-(0) = \begin{bmatrix} 100 & 0 \\ 0 & 100 \end{bmatrix}$$

$$\underline{\hat{\Theta}}^-(0) = \begin{bmatrix} 0 \\ 0 \end{bmatrix}$$

For the positive torque datasets fresh estimates $\hat{m}^+$ and $\hat{d}$ are formed, using a similar sequence of steps, but with a separate matrix $\underline{P}^+$ and a revised step ii:

(ii) Calculate the estimation residual $\epsilon^+(t+1)=y(t+1)-\underline{x}(t+1)\underline{\hat{\Theta}}^+(t)-\hat{c}^-(t)$, where $y(t+1)$ is the matching relative displacement, $$\underline{\hat{\Theta}}^+ = \begin{bmatrix} \hat{m}^+ \\ \hat{d} \end{bmatrix}$$

is the estimate vector, and $\hat{c}^-(t)$ is the latest available estimate of the constant from the negative secondary datasets.

In this method of estimating backlash and compliance, the values of $c^-$ and d are estimated, but not the value of $c^+$ (which is the positive equivalent of $c^-$). This approach is advantageous because the estimate $c^-$ is a correction to the datum of the ideal steering shaft position, and as such needs to be updated every time the clutch is disengaged.

In contrast, the value of d will remain constant even if the "ideal" output shaft datum is reset, and so can be reused by the filters on start-up to increase the rate of learning of the filters. This would not be possible if only values of $c^-$ and $c^+$ were estimated, and d was calculated from the difference between $c^-$ and $c^+$. However, if required, this latter approach could be employed.

The values of $m^+$, $m^-$ and d can therefore be carried over from the last operation every time the monitoring system is switched on. Non-volatile memory is used to store the estimate values.

Initial conditions for the positive secondary dataset estimator may be set when first used to:

$$\underline{\hat{P}}^-(0) = \begin{bmatrix} 100 & 0 \\ 0 & 100 \end{bmatrix}$$

$$\underline{\hat{\Theta}}^+(0) = \begin{bmatrix} 0 \\ 0 \end{bmatrix}$$

Similarly, the confidence matrices $\underline{P}^t$ are just as valid at the start of a new period of clutch engagement as at the end of the previous one, and can also be used for re-starting.

$$\underline{P}^+(0)_{newstart} = \underline{P}^+_{old}$$

$$\underline{\Theta}^+(0)_{newstart} = \underline{\Theta}^+_{old}$$

However, the old values of $\hat{c}^-$ have no significance, and can equally well be replaced by zero. Similarly the corresponding element of the confidence matrix $\underline{P}^-$ should be reset to the relatively high value used to ensure a high initial rate of "learning":

$$\underline{P}^-(0)_{newstart} = \begin{bmatrix} P^-_{11(old)} & 0 \\ 0 & 100 \end{bmatrix}$$

$$\underline{\hat{\Theta}}^-(0)_{newstart} = \begin{bmatrix} \hat{m}^-_{old} \\ 0 \end{bmatrix}$$

Note that the relative position of motor rotor and worm gear may change if the clutch looses its grip for any reason, such as a deliberate interruption of steering assistance service. This might occur while the MCU determines that an apparent fault is in fact a false warning or has no serious consequences. Accidental slipping may occur due to a shock load or a low clutch solenoid supply voltage. Such events may be directly recognised by the MCU, or be inferred from the system of the invention by a sudden unexplained change in the $\hat{c}^-$ estimate once $P^-_{22}$ has fallen below a threshold value, say 0.03, that indicates reasonable confidence in the estimates. In either instance the MCU will restart the detection system estimators as described above.

Until the $\underline{P}$ matrix elements have all fallen below threshold values, diagnostic comparisons would not be allowed, nor would any fresh updates be made to the estimates in non-volatile storage should the period of operation come to an early end. Alternatively, diagnostic comparisons are only allowed after a certain time has elapsed since starting the estimator, and/or a certain number of datasets have been processed by the estimator.

A potentially excessive requirement for non-volatile memory can arise if a multiplicity of estimator pairs is employed: such a scheme and its benefits will be described below. A number of measures may however be taken to reduce the requirement for non-volatile storage. A single estimate $\hat{m}$ may be distilled (average, worst) from the separate estimates for the clockwise and anti-clockwise compliances, and stored instead, or a single $\hat{m}$ estimate may be substituted during the period of operation for the separate $\hat{m}^-$, $\hat{m}^+$ estimates in $\underline{\hat{\Theta}}^+$ and $\underline{\hat{\Theta}}^-$. The inventors have further discovered that estimates of the backlash and tooth compliance can also be made without the expense of continually updating $\underline{P}$ matrix values (step iii, above) and storing them in NVRAM between operational periods. Fixed values such as $$\underline{P}^- = \begin{bmatrix} 0.0130 & 0.0118 \\ 0.0118 & 0.0159 \end{bmatrix}; \quad \underline{P}^+ = \begin{bmatrix} 0.0130 & -0.0118 \\ -0.0118 & 0.0159 \end{bmatrix}$$

have also been found to give good results in tracking changes in the backlash and gearset compliance. A higher values of $\underline{P}^-_{22}$ may be employed to give fast adjustment for the $\hat{c}^-$ estimate during the first, say, 100 datasets, before switching to the normal value. During such an initial fast adjustment period no diagnostic comparisons would be allowed, nor would any fresh updates be made to the estimates in non-volatile storage should the period of operation come to an early end.

If tooth deterioration is confined to a limited part of the worm wheel it will be somewhat masked by the measurements made when the undamaged teeth are in engagement. Consider a system for a motor car used on normal roads. For the vast majority of the operating time the only worm wheel teeth in mesh are the few really close to the straight-ahead position. These same teeth are again in mesh when the driver has applied one whole turn of the steering wheel (usually a high assistance torque condition) so they experience both prolonged low-level reversing loads in the straight-ahead position and occasional high loads near to full lock. They are probably the most vulnerable of the worm wheel teeth, and they will tend to dominate the estimates because of their frequent occurrence. Nevertheless, they will be under-represented in the estimates due to the filtering out of datasets with low steering velocity or low gearset torque.

To obviate this masking effect a multiplicity of the estimator pairs described above may be employed to provide more detailed knowledge about the distribution of tooth deterioration around the worm wheel. For instance, one estimator pair may be assigned to a given sector of the steering shaft rotation: all datasets with steering shaft position measurements in this sector are fed to this estimator pair, updating estimates that correspond to the given sector alone.

In a first arrangement, there may be one such estimator pair for each tooth of the worm wheel. In a second arrangement requiring less computational resources, there may be one such estimator pair for each tooth lying close to the straight-ahead position together with one estimator pair for all the remaining part of the worm wheel rotation. In a third arrangement requiring even less computational resources, there may be a first estimator pair for all the teeth lying close to the straight-ahead position together with a second estimator pair for all the remaining part of the worm wheel rotation.

If the value of any of the estimates, $\hat{m}^-$, $\hat{m}^+$ and $\hat{d}$ from any sector rises above a predetermined threshold value then the MCU will issue a warning to the system operator or to service personnel via a warning light or diagnostic interface connection or otherwise. It will also disconnect the clutch.

In the case where multiple estimator pairs are employed, if the $\hat{c}^-$ estimates were to vary excessively from sector to sector during a period when the clutch is deemed to be firmly engaged and $\underline{P}^-_{22}$ has already fell below the threshold, then a problem with the driven gear integrity or the diagnostic measurement or algorithm would be indicated.

The signal processing means can therefore detect an incipient failure in the gearbox by estimating the backlash and compliance.

A warning signal means 16, as shown in FIG. 3, is also provided. The warning signal means provides a warning signal to the operator from the electric motor after the clutch has been disengaged independent of any warning lights or diagnostic interface connections. If the motor is driven in the clockwise and then the anticlockwise directions with a steady current level of, say 40 amps, alternating at a frequency of between 10 and 80 Hz then a distinctive sound will be heard in the passenger cabin. To ensure that this signal is recognised as a warning and not simply a symptom of the gradual loss of acoustic refinement that the owners of older cars normally experience, the inventors have modulated the amplitude of the signal at a lower frequency to give a distinctive audible warning, for instance the internationally well-known Morse code signal SOS. A swept frequency or chirp signal can also be employed to render the signal more distinctive. The inventors have further noticed that certain frequencies, for example 66 Hz in the case of one power steering application, may excite a resonance in the steering shaft assembly and thus make the signal more noticeable, even to profoundly deaf people by a tactile path through the steering wheel. The inventors propose that this signal is used only to alert the driver to gearset deterioration or other conditions that presage a severe safety risk. The signal will be sounded when it is relatively easy and safe to get the driver's attention, e.g. before the engine is started, before the vehicle is moved, or immediately after use.

Finally, the inventors have further considered how to alleviate the load on the gearset in the case of a clutchless system or one in which the clutch disconnection reliability is uncertain. They have realised that the motor can be controlled to minimise the gearset torque, simply being driven so as to produce enough torque to accelerate the rotor to match the movement of the "driven" gear. In the case of a system which has a gearset torque demand parameter within the assistance control software, then this will be set to zero.

By these measures, indicated in response to a modified output from the gearbox monitoring apparatus, the loading on the gearset can be reduced to a small fraction of the in-service loading. This will reduce the risk that further deterioration will lead to the gearset jamming. The loss of the assistance function will also act as an incentive to the driver to get the vehicle serviced.

Figure 8:
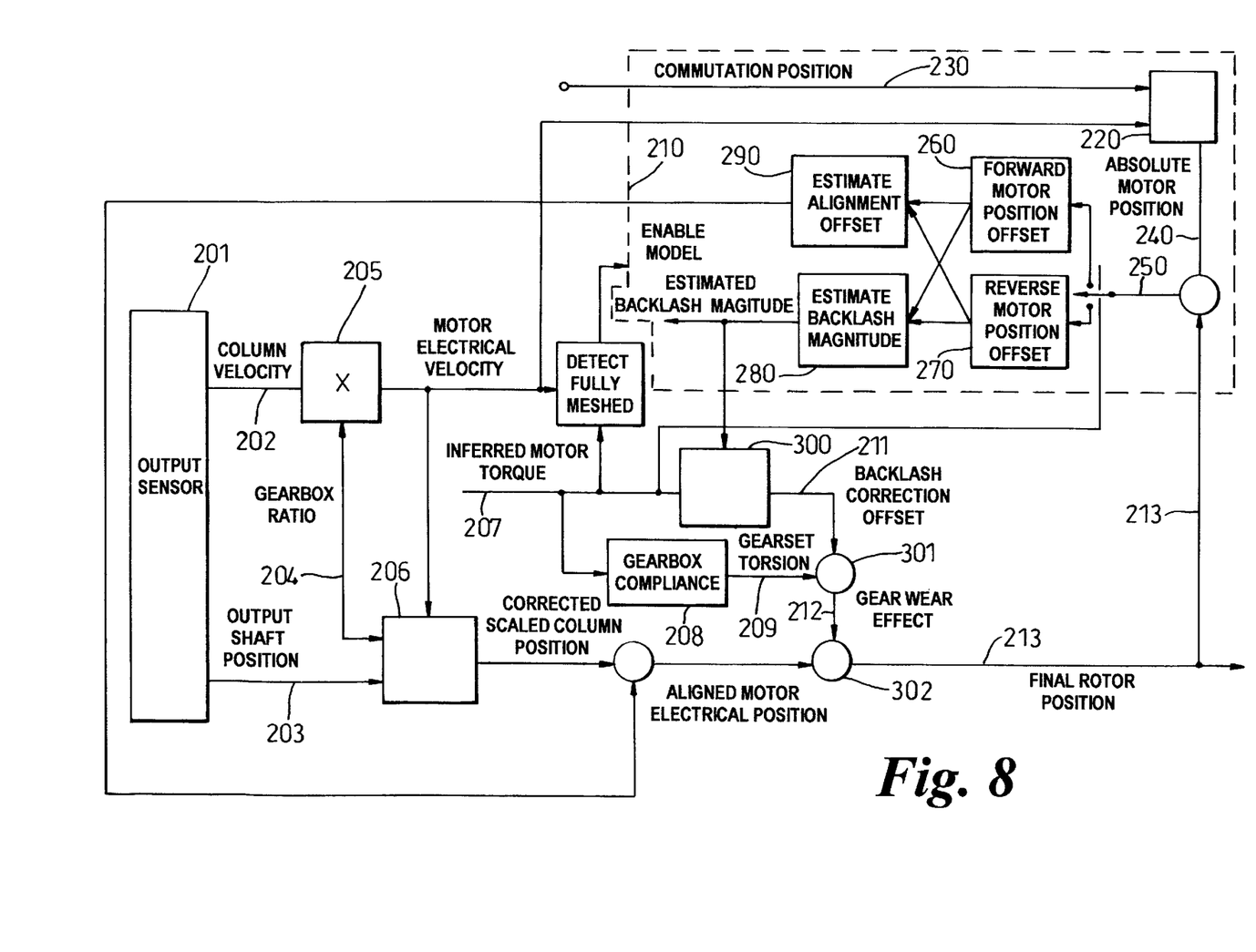
FIG. 8 illustrates a second control strategy for a motor in which the backlash and compliance in a gearbox are evaluated.

A control strategy which embodies an alternate method of calculating backlash and compliance is shown schematically in FIG. 8 of the accompanying drawings.

In this embodiment, a gearset compensation signal is calculated which is made of two components: gearset torsion and backlash correction offset as per the first embodiment. Some gearsets have been found to have backlash that increases very slowly as the gearteeth wear, but to have compliance that hardly varies at all over the life of an EPAS system. A prescribed gearset compliance is therefore multiplied by motor torque (which may be inferred from measurements of the motor current) to yield gearset torsion. The backlash correction offset depends on the motor torque and an estimate of the backlash magnitude derived in software to be described below.

The velocity of the motor and the motor torque are employed to decide whether to update the gearset parameter estimates. The model is updated whenever the motor torque is consistent with the gearset being meshed and the motor speed is neither too fast nor too slow for accurate measurement.

When these conditions are met the signals from the Hall effect sensors are first decoded and then corrected for measurement staleness. The difference between the motor electrical position signal and the corrected rotor position measurements is used to define the error in a "motor offset" model. The model has two output parameters, the estimated alignment offset and the estimated backlash magnitude. They are adjusted so as to keep the average motor offset model error close to zero.

An estimated backlash magnitude component is derived by low pass filtering the difference between two position offsets, the forward and the reverse. The forward offset is adjusted to keep the average motor offset model error close to zero when the motor torque is positive and the reverse when it is negative. The two offsets are thus adjusted to account for the average column/motor discrepancy when either one face of the gearset is in mesh, or the other. The difference between the two offsets may increase slightly over the life of the EPAS unit as the faces of the gearset wear. The backlash magnitude parameter may be compared with a threshold value, so as to indicate unacceptable wear. Since the backlash magnitude will vary only very slowly it may be stored in non-volatile memory (NVM) at the end of each journey. The low-pass filter can be re-initialized to the NVM value at the start of each journey.

The estimated alignment offset is calculated from slew-rate limiting the mid-point of the two position offsets. Since the column position is usually referenced to an entirely arbitrary datum (such as the power-up value) the mid-point of the two position offsets is also entirely arbitrary at start-up and no benefit arises from storing an averaged value in NVM. Instead the slew rate filter can be re-started from the first position offset measurement.

The control strategy is described in more detail in the following description which illustrates the various steps embodied in the schematic of FIG. 5. It will be noted that position values are expressed in this embodiment in degrees as opposed to being in a range of values from 0 to 1 as for the first embodiment.

In a first step, values of column velocity 202 and absolute output shaft position 203 are obtained using a column sensor (i.e. a combined torque and position sensor) 201. This step is essentially the same as for the first embodiment, and can employ the same sensors and trigger signal to obtain a continuous or interrupted train of data values.

Next, using a preset value of gearbox ratio 204 as for the first embodiment the values 202, 203 are multiplied by the gearbox ratio to produce a value of motor electrical velocity 205 and corrected scaled output shaft column position value 206 according to:

Corrected scaled output shaft position value=[(measured output shaft position value×gearbox ratio)+(motor velocity×time since last measurement of absolute output shaft position value)] mod 360°

Motor electrical velocity=(measured output shaft velocity×motor output shaft ratio)

The corrected scaled output shaft position value this incorporates a correction for movement of the rotor between changes in the measured value of output shaft position.

From the value of corrected scaled output shaft position, a value of the aligned motor electrical position can be calculated as follows:

aligned motor electrical position=MOD 360 (scaled output shaft position+estimated alignment offset)

The estimated alignment offset is an output obtained from a model 210 of the parameters of the gearset used as described below.

The compensation for the effect of the gearset is made up from two components: gearset torsion (due to compliance) and backlash correction offset. Some practical gearsets have been found to have backlash that increases very slowly as the gearset teeth wear, but to have compliance that hardly varies at all over the life of the system. Accordingly, unlike the first embodiment it is possible to use a fixed value of gearset compliance 208 (for example stored in a non-volatile memory) which can be multiplied by the motor torque 207 to yield a gearset torsion 209 such that:

gearset torsion=gearbox compliance motor torque.

The motor torque value may be measured or inferred.

Whilst a predetermined value of compliance can be used successfully, a calculated value of backlash is needed to take into account changes due to wear of the teeth.

The backlash correction algorithm of the second embodiment generates a "backlash correction offset value" 211 that depends on the motor torque using a gearset model 210.

The characteristics will always be symmetrical about zero and shall be defined by the BACKLASH CORRECTION HYSTERESIS GAIN and the BACKLASH CORRECTION HALF WIDTH.

The value of backlash correction offset shall be bounded so that its magnitude does not exceed the estimated backlash magnitude÷2. These calculations are made at every iteration.

Estimated backlash magnitude is an output of the model of the gearset.

```
IF BACKLASH CORRECTION HYSTERESIS GAIN*
(motor torque-BACKLASH CORRECTION HYSTERESIS HALF WIDTH
                        > old backlash correction offset
THEN    backlash   correction    offset = BACKLASH    CORRECTION
HYSTERESIS    GAIN    *    (motor    torque-BACKLASH    CORRECTION
HYSTERESIS HALF WIDTH)
ELSE IF BACKLASH CORRECTION HYSTERESIS GAIN *
        (motor torque + BACKLASH CORRECTION HYSTERESIS HALF
WIDTH < old backlash correction offset
THEN    backlash    correction    offset = BACKLASH    CORRECTION
HYSTERESIS    GAIN*    (motor    torque + BACKLASH    CORRECTION
HYSTERESIS HALF WIDTH)
ELSE
        backlash correction offset = old backlash correction offset
END
backlash correction offset =
        MIN (
MAX ( backlash correction offset, -estimated backlash magnitude/2),
                                    + estimated backlash magnitude/2)
old backlash correction offset = backlash correction offset
        Where   MIN(x,y) is the algebraic minimum of x and y,
        and     MAX(x,y) is the algebraic maximum of x and y.
```

The gearset torsion 209 and backlash correction offset 211 can then be combined to produce a gear wear effect value 212 which may be combined with the value of aligned motor position to produce a final estimated motor rotor position value 213 such that:

final estimated rotor motor electrical position value= MOD 360 (aligned motor electrical position+gear wear effect)

gear wear effect=backlash correction offset+gearset torsion.

Alternatively, if the final estimated motor rotor position value calculated in this manner could be unreliable, ie upon start-up, the following expression can be used:

final estimated motor rotor position=commutation centre position given by motor position sensors An additional function may be provided which is adapted to continuously detect when the gearbox is fully meshed (ie it does not lie in the backlash region). The relationship between the motor position and the column position can then be used to update the motor offset model.

A minimum velocity threshold may also be imposed which is set high enough to avoid updating the absolute motor position and the gearset model from a Hall sensor transition which is "too old".

The gearbox full meshed flag can be set to indicate that the gearbox is fully meshed whenever the following conditions are all met:

ABS (motor electrical velocity)>MOTOR MESH MIN VELOCITY THRESHOLD

ABS (motor electrical velocity)<MOTOR MESH MAX VELOCITY THRESHOLD

ABS (motor torque)>MOTOR MESH MIN TORQUE THRESHOLD

SIGN (motor torque)=SIGN (motor electrical velocity)

The flag shall be reset if any of the above conditions do not hold.

In a first stage of the gearset model 210, the motor electrical velocity 205 is combined 220 with a measure of the absolute motor position 230 obtained from position sensors in order to produce an absolute motor position value 240 which is compensated for the time elapsed since the measurements were made such that:

Corrected absolute motor position=MOD 360 (measured absolute motor position value+[motor electrical velocity×(time now-time of measurement)]

Thus, where a Hall effect sensor is used to measure absolute motor rotor position, this algorithm compensate for movement of the motor rotor between changes in Hall effect sensor state to increase accuracy.

The value of corrected absolute motor position 240 is then combined with the value of final estimated motor rotor position 213 to produce a motor offset model error value given by:

motor offset model error=MOD 360 (corrected absolute motor position-final estimated motor rotor position+ 180°)−180°

This signed expression is the shortest angular distance from the motor electrical position to the absolute motor position in either direction around the circle and hence constrains the motor offset model error to lie within −180° to +180°). If, during a journey, absolute motor position consistently leads motor electrical position by, say, 10° when driving in a positive direction, then this expression will produce a consistent+10° result even when absolute motor position wraps round from 360° to 0° while motor electrical position is still climbing from 350° towards 360°. The motor offset model error is equally likely to be positive as negative when the motor is driving in a positive direction, and vice versa.

Having calculated the motor offset model error 250, a motor position offset is calculated for each direction of drive, forward 260 and reverse 270. Each of these motor position offsets is individually urged by integral action towards a target value (unknown at the start of a journey) that will yield a low motor offset model error. The generation of these offsets from an error signal with a low average value requires substantial DC gain (eg integral action) to reveal the difference in the relative positions of, say, the worm and (scaled) wormwheel during forward and reverse drive.

One of the two offset values can be updated according to the direction of motor torque:

---

IF (motor torque > 0) THEN
    forward motor position offset = (forward motor position offset +
        motor offset model error * motor position offset
        error gain)
ELSE
    reverse motor position offset = (reverse motor position offset +
        motor offset model error* motor position
        offset error gain)
ENDIF

---

The offset values can both be initialized when the first motor offset model offset model error 250 is calculated. A "motor offsets initialized flag" can then be set to indicate that the motor offset model error 250 is now valid. The offset values can be initialiazed according to the direction of motor torque:

---

IF (motor torque > 0) THEN
    forward motor position offset = corrected absolute motor position−corrected scaled output shaft position−gear torsion
    reverse motor position offset = forward motor position offset−estimated backlash magnitude ELSE
    reverse motor position offset = corrected absolute motor position−corrected scaled output shaft position−gear torsion
    forward motor position offset = reverse motor position offset + estimated backlash magnitude
ENDIF

---

The two values (forward and reverse) of motor position offset 260, 270 can then be combined to produce an estimate of the backlash magnitude and an estimate of the alignment offset 290.

An estimated backlash magnitude 280 can then be produced from the difference between the two motor position offsets 260 and 270:

--- measured backlash magnitude = min(max (forward motor position
    offset-reversed motor position offset, 0°),
    MAX ESTIMATED BACKLASH)
estimated backlash magnitude = [measured backlash magnitude +
    (backlash filter constant−1) *
    estimated backlash magnitude]
    / backlash filter constant

---

The estimated backlash magnitude shall be restored from NVM at the beginning of each journey and stored back to NVM at power-down. A further filter shall be applied when storing the estimated backlash magnitude to NVM to prevent somewhat erroneous data gathered during a short journey from having a long-term affect on the system performance. This filter shall limit the change to a maximum of ± NVM BACKLASH MAX CHANGE per power cycle.

The backlash magnitude estimate 280 is used to calculate backlash correction offset 300 which can be combined 301 with the gearbox torsion valve 209 to yield the value of gear wear effect 212 which is added 302 to the aligned motor electrical position value to yield the final value of motor electrical position 213.

The backlash correction algorithm generates a position correction component that depends on the motor torque.

At the first ever system power-down during initial EPAS unit testing, the value of estimated backlash magnitude shall be stored in NVM without filtering.

---

The estimation of the alignment offset can be updated towards the mid-point of the two motor position offsets:-
    measured alignment offset−(reverse motor position offset + forward motor position offset) ÷ 2
    alignment offset change = measured alignment offset-estimated alignment offset
    alignment offset change = min (
max (alignment offset change,
        −ALIGNMENT OFFSET MAX CHANGE),
        + ALIGNMENT OFFSET MAX CHANGE)
    estimated alignment offset = estimated alignment offset + alignment offset change

---

On initialisation, the following estimate of alignment offset can be used:

estimated alignment offset=(reverse motor position offset+forward motor position offset)÷2

Of course, it will be understood that the gearset model 210 described hereinbefore is not limited to use as part of an overall control strategy as shown in FIG. 8. It is envisaged within the scope of this invention that the gearset model 210 can be used to calculate the gearset backlash in any system where a gearbox connects and input shaft to an output shaft provided that the required input parameters of Hall effect (or other position sensor) signal, input shaft position and output shaft position signal are known or can be estimated.

I claim:

1. A gearbox monitoring apparatus for use in combination with a gearbox which provides a connection between an input shaft and an output shaft, said gearbox monitoring apparatus comprising:

a first position sensing means, and a second position sensing means, said first and second position sensing means generating a respective first output signal and a second output signal, said first output signal being representative of the angular position of said input shaft, and said second output signal being representative of an angular position of said output shaft;

a torque signal generating means which generates a third output signal representative of torque carried by said gearbox; and signal processing means receiving said output signals, said signal processing means producing a difference signal representative of the difference between said angular position of said input shaft and said output shaft from said first and second output signals, wherein said signal processing means divides said difference signal into two streams corresponding to said third output signal representative of negative torques and positive torques respectively and processes said two streams of output signals to produce at least one modified output signal representative of wear in said gearbox.

2. A gearbox monitoring apparatus according to claim 1 wherein said input shaft is driven by a motor.

3. A gearbox monitoring apparatus according to claim 1 wherein said torque signal generating means comprises a torque sensor.

4. A gearbox monitoring apparatus according to claim 1 wherein said gearbox torque is inferred as a function of at least one measured parameter.

5. A gearbox monitoring apparatus according to claim 1, producing a first modified output signal representative of backlash and a second modified output signal representative of compliance of a gearset within said gearbox.

6. A gearbox monitoring apparatus according to claim 5, wherein said first modified output signal is produced by correlating said signals from said first and second position sensors at different torque values.

7. A gearbox monitoring apparatus according to claim 5, wherein said second modified output signal is provided by correlating said signals from said first and second position sensors at different torque values.

8. A gearbox monitoring apparatus according to claim 5, wherein a value of compliance is stored as a preset estimated value.

9. A gearbox monitoring apparatus according to claim 1, which further includes a speed sensor which generates a fourth output signal representative of rotational speed of said output shaft.

10. A gearbox monitoring apparatus according to claim 9 wherein a single sensor is used to provide both said third output signal and said fourth output signal.

11. A gearbox monitoring apparatus according to claim 1, which further includes a trigger means generating a trigger signal in response to a trigger stimulus, sensing means, a dataset of output signals being produced in response to said trigger signal, and said dataset comprising a single output from each said sensing means.

12. A gearbox monitoring apparatus according to claim 11, wherein said trigger stimulus is a set position of one of said input shaft and said output shaft.

13. A gearbox monitoring apparatus according to claim 11, wherein said trigger stimulus is a clock signal with datasets being produced on each clock pulse.

14. A gearbox monitoring apparatus according to claim 11, wherein each of said sensing means produces a continuous output signal which is sampled by said signal processing means on each said trigger signal.

15. A gearbox monitoring apparatus according to claim 11, wherein said trigger stimulus is the movement of a motor rotor magnetic pole past a Hall effect sensor.

16. A gearbox monitoring apparatus according to claim 11, wherein said output signals forming said dataset are synchronized so that they each represent a state of measurements from said sensing means at an instant in time determined by said trigger signal.

17. A gearbox monitoring apparatus according to claim 1, including a warning means producing a warning signal in the event that the said modified output signals produced by said signal processor indicate a jam has occurred or is likely to occur.

18. A gearbox monitoring apparatus according to claim 17, wherein said warning signal is in the form of an audio/visual or haptic signal.

19. A gearbox monitoring apparatus according to claim 1, wherein said first output signal and said second output signal are measured relative to a respective arbitrary datum.

20. A method of monitoring the performance of a gearbox which drives an output shaft comprising a first step of calculating a desired output shaft position by processing a first output signal, and a second step of calculating a difference signal y representative of difference between the desired output shaft position signal and an actual measured output shaft position signal, and fitting a difference value and respective torque into a pair of linear equations, each linear equation corresponding to one of a stream of values.

21. A method according to claim 20, which further comprises a fourth step of using a fourth output signal (speed signal) associated with each of said first and second output signals in a dataset to determine accuracy of said first and second output signals, and rejecting any datasets if said speed is either above a first preset value or below a second preset value.

22. A method according to claim 20, wherein said signal processor employs a recursive estimating filter in order to estimate backlash and compliance values from displacement and torque signals.

23. A method according to claim 22, wherein said recursive estimating filter generates a confidence signal which is estimate of the accuracy of said backlash and compliance values.

24. A method according to claim 23, wherein said confidence signal is processed by said warning signal indicating means so that a warning signal is only generated if said backlash and compliance values meet preset criteria and the reliability of the signals also meets a preset level, said backlash and/or compliance values obtained by when said method was last used are retained and re-used as the start-up values for said recursive estimating filter.

25. A method according to claim 20, which comprises the additional steps of generating several sets of backlash and compliance signals, each set corresponding to a different angular position of the output shaft.

* * * * *